Oct. 26, 1965 G. D. RUSSELL ETAL 3,214,323
NONWOVEN FABRICS AND METHODS OF MAKING THE SAME
Filed Feb. 11, 1964 9 Sheets-Sheet 1
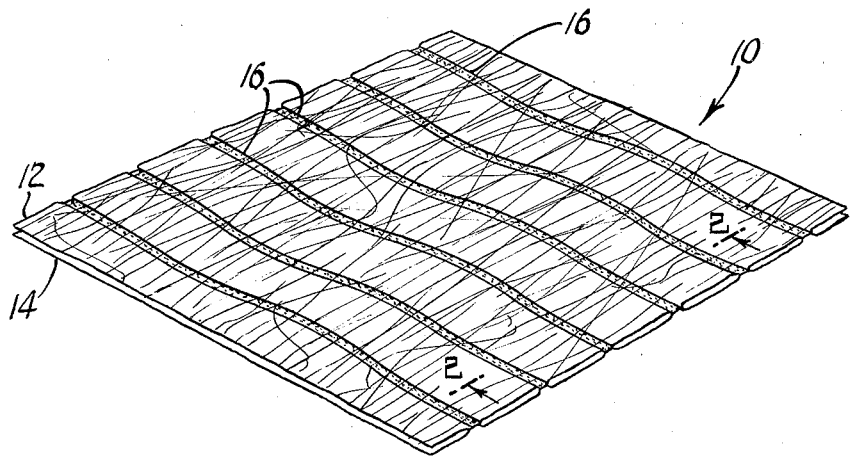
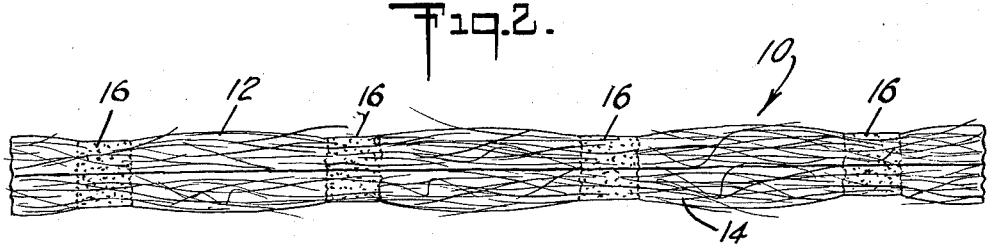
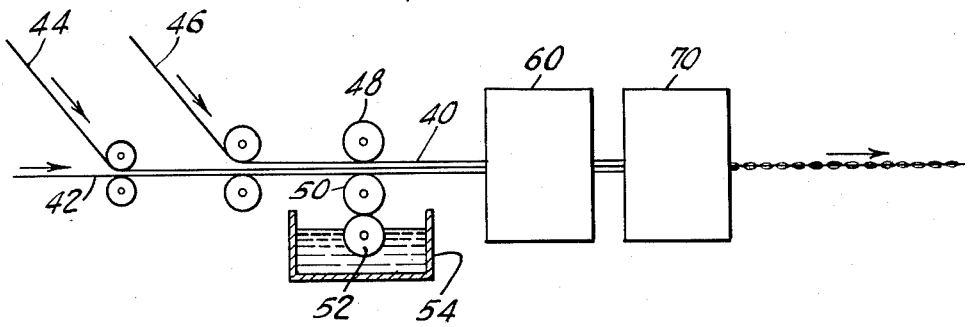
INVENTORS:
GORDON D. RUSSELL
IVAN BERING
BY John W. Tregoning
ATTORNEY

INVENTORS:
GORDON D. RUSSELL
IVAN BEARING
BY
ATTORNEY

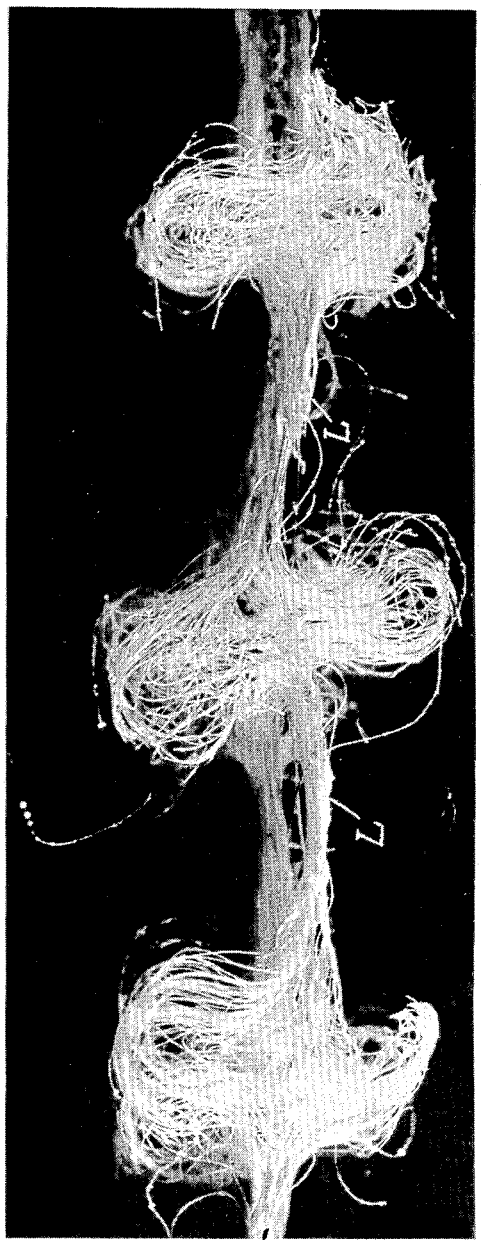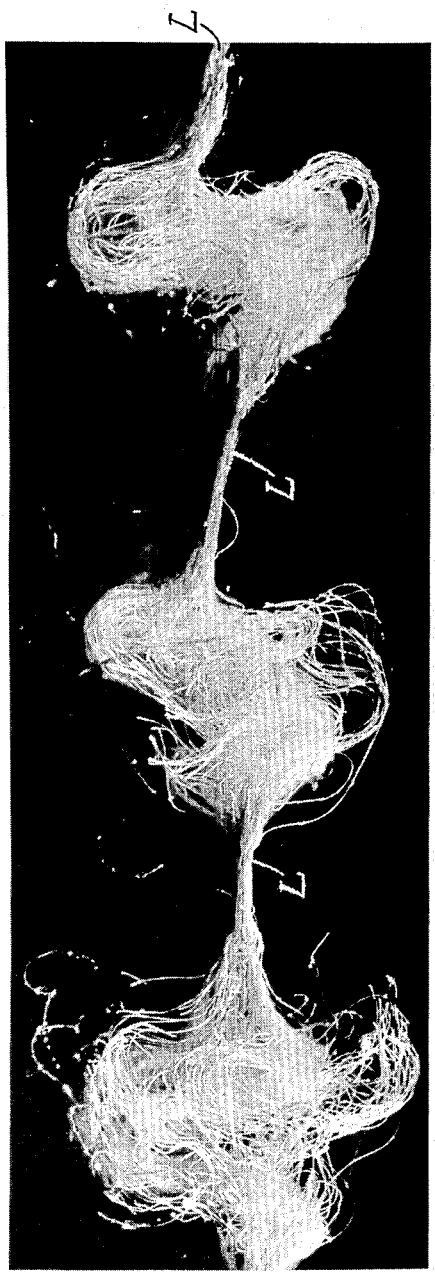

United States Patent Office 3,214,323
Patented Oct. 26, 1965

3,214,323
NONWOVEN FABRICS AND METHODS OF
MAKING THE SAME
Gordon D. Russell, Chateauguay Heights, Quebec, and
Ivan Bering, Edmonton, Alberta, Canada, assignors to
Johnson & Johnson, a corporation of New Jersey
Filed Feb. 11, 1964, Ser. No. 344,123
9 Claims. (Cl. 161—148)

The present invention relates to textile fabrics having a lofty, bulky appearance and unique three-dimensional surface interest and to methods of making the same. More particularly, the present invention is concerned with so-called "nonwoven" textile fabrics, i.e., fabrics produced directly from individualized textile fabrics without the use of conventional spinning, weaving or knitting operations, and to methods of creating unusual three-dimensional effects in such nonwoven textile fabrics.

Although not limited thereto, the invention is of primary importance in connection with nonwoven fabrics formed from card webs of individualized textile fibers, the major proportion of such textile fibers being oriented predominantly in one direction. Typical of such nonwoven fabrics are the so-called "Masslinn" nonwoven fabrics, some of which are described in greater particularity in U.S. Patents 2,705,687 and 2,705,688 which issued April 5, 1955, to De Witt R. Petterson et al. and Irving S. Ness et al., respectively.

Another aspect of the present invention is its application to nonwoven fabrics wherein the individualized fibers are basically predominantly oriented in one direction but are also reorganized and rearranged in predetermined designs and patterns of fabric openings and fiber bundles. Typical of such nonwoven fabrics are the so-called "Keybak" bundled fabrics, some of which may be produced by methods and with apparatus more particularly described in U.S. Patent 2,862,251 which issued December 2, 1958, to Frank Kalwaites.

Still another aspect of the present invention is its application to nonwoven fabrics wherein the individualized fibers are disposed at random and are not predominantly oriented in any one direction. Typical of such nonwoven fabrics are the so-called "Isotropic" nonwoven fabrics, some of which may be produced by methods and with apparatus more particularly described in U.S. Patents 2,673,363 and 2,676,364 which issued April 27, 1954, to Charles H. Plummer. Other examples of typical nonwoven fabrics wherein the fibers are not predominantly oriented in any one direction are those made by modified papermaking techniques.

Nonwoven fabrics made by any of the above-described methods and apparatus have become increasingly important in the textile and related industry, primarily because of their low cost of manufacture for a given coverage, as compared to the cost of more conventional textile fabrics made by spinning, weaving and knitting operations. Examples of uses for such nonwoven fabrics are wrapping and packaging materials, surgical dressings and bandages, covers or other components of sanitary napkins, hospital caps, dental bibs, eye pads, dress shields, diapers and diaper liners, casket liners, wash cloths, hand and face towels, handkerchiefs, table cloths and napkins, curtains and draperies, quilting or padding, cleaning materials, shoe shine cloths, battery separators, air or other filters, etc. Because of this wide variety of uses, these nonwoven fabrics are available commercially in a wide range of fabric weights of from as little as about 140 grains per square yard to as much as about 2600 or more grains per square yard.

Fabric stability and strength are usually created in such nonwoven fabrics by bonding with adhesive or cementitious materials. The bonding operation employed for stabilizing and strengthening nonwoven fabrics has taken on many forms, one popular form being the intermittent bonding of the nonwoven fabric with a predetermined pattern of spaced, discrete binder areas or lines extending across the width of the nonwoven fabric. The individual fibers passing through these binder areas or lines are adhered into a stable, self-sustaining relationship. The binder areas may also take on any desired shape or form including circles, annuli, ovals, ellipses, triangles, rectangles, squares, diamonds, parallelograms, or other polygons, or combinations of such forms, either regularly or irregularly shaped. The binder lines may extend across the nonwoven fabric at any desired angle to the long axis; the binder lines may be parallel, or they may cross each other to form diamond or irregular polygonic figures; the binder lines may be continuous or discontinuous; or they may be straight, curved, sinuous, or irregularly wavy. Examples of some of these patterns and shapes may be found in the above-mentioned U.S. Patents 2,705,687 and 2,705,688 or in U.S. Patent 2,880,111.

One common factor, however, is to be particularly noted in all of these patterns, namely, that the total surface coverage of the binder areas or lines on the nonwoven fabric should not substantially exceed about 35% of the total surface of the nonwoven fabric. Preferably, such coverage should be less than about 25% and sometimes down to about 8% of the total surface of the nonwoven fabric.

Substantially all prior art nonwoven fabrics, regardless of their method of manufacture or of the particular bonding techniques employed, however, have usually suffered from certain inherent disadvantages and weaknesses which have militated against their more widespread acceptance and use by the industry and the ultimate consumer.

For example, due to the nature of the fibrous construction and the orientation and relationship of the individual fibers in such prior art nonwoven fabrics, many of them have been rather thin, flat, two-dimensional and drab, and often lacking in fullness, softness and surface interest. This is, of course, objectionable to the industry and to the consumer inasmuch as such fabrics tend to be harsh, papery and deficient in bulk, loft, softness and hand.

It has now been discovered that three-dimensional nonwoven fabrics may be produced having a novel appearance and unique surface interest, along with increased bulk and loft as well as a full and soft hand. Such nonwoven fabrics are not thin, flat or drab and do not have a harsh or papery feel.

The fabric of this invention is a laminate of a plurality of layered webs of individualized textile fibers intermittently bonded together in a predetermined pattern of spaced binder areas, at least one of said layers comprising a fibrous web of non-activating fibers, and at least one other of said layers comprising a fibrous web of overlapping, intersecting activating fibers having a fiber length greater than the space between adjacent binder areas whereby said activating fibers are bonded in at least two points along their length, said fabric being characterized by a series of buckled sections and concomitant trough sections, said trough sections representing the binder areas wherein said fibers are closely associated in substantially the plane of the fabric, and said buckled sections representing the unbonded areas of the fabric wherein the individual fibers are substantially diffused with respect to one another, between the plane of the fabric and the vertex of said buckled section.

These nonwoven fabrics may be produced by assembling a plurality of nonwoven fibrous webs, at least one web comprising relatively shrinkable or activating fibers and at least one other web comprising relatively nonshrinkable or non-activating fibers, bonding the plurality of fibrous webs together by means of a predetermined intermittent pattern of binder areas or lines, and then exposing the plurality of webs to a treatment sufficient to shrink the activating fibers. In this way, the activating fibers contract within the non-bonded areas, to a fraction of their original length, causing the individualized fibers in the non-bonded areas to diffuse with respect to one another to cause the fibrous webs to become puffed and distended and to extend away from the original plane of the fibrous web in the form of pillows, buckles, ripples, ridges, etc., as determined by the pattern of the spaced binder areas; however, there is relatively no shrinkage by the activating fibers within the bonded areas, since the bonding medium holds the individualized fibers firmly in position in this area.

As used herein the phrase "plane of the fabric" refers to a plane running laterally through approximately the lowest portion of the base of each of the cavities forming the troughs or binder areas of the fabric. Thus, the plane of each fabric would connect the approximate points, L, of each trough portion of the fabric as is shown in each of the FIGURES 3 through 7e.

The term "percentage shrinkage" as used herein is defined as equaling the original length of the fabric minus the shrunken length of the fabric after the desired shrinking has been developed, divided by the original length of the fabric, all taken times 100.

By the term "differential in shrinking" as used herein is meant the measurable temperature difference in the development of the shrinking properties of one type fiber as compared to that of another type. To explain, the shrinking properties of the fibers of one type or kind would be developed at a given temperature or within a narrow temperature range, while the shrinking properties of another type or kind of fiber, (1) may be developed to a measurable, but to very much lesser, extent at that temperature, or (2) may not be developed at that temperature even though the fiber has latent shrinking properties, or (3) is not developed because that particular fiber does not have shrinking properties.

In light of the preceding discussion, it is understood that the fibers that shrink at the lower temperature to an extent sufficient to be directly, and essentially solely, responsible for the characteristic buckling of the fabric are termed the activating fibers, while the remainder are termed non-activating fibers, even though the latter may fall into categories (1) or (2) as defined in the preceding paragraph. Thus in the case of heat treatment, the fibers which have their shrinking properties developed at the lower temperature and thus affect the buckling, are the activating fibers. The treatment temperature is then dependent upon the known temperature at which the shrinking property of the fibers is developed. In the case of other means of activation, e.g., chemical, it is that known condition, state or reaction which develops the shrinking properties of one type or kind of fibers, i.e., activating fibers, without affecting or developing more than a very minor degree, the shrinking properties of any other type or kind of fiber present in the fabric. Therefore, in all cases the characteristic buckling is directly related to, and and dependent upon, the extent or degree of shrinkage of the activating fibers.

The particular treatment employed to cause the activating fibers to contract within the unbonded areas of the fabric may be chemical and/or physical in nature. Although many methods involving the use of chemical shrinking agents are possible, the preferred treatment is a simple heating method which develops the potential shrinkable properties of the activating fibers. Such simple heat treatment will be used hereinafter to describe the present invention. It is to be pointed out, however, that the use of such heat treatment with such heat-shrinkable fibers rather than chemical treatment of chemical-shrinkable fibers is merely illustrative and that such is not to be construed as limitative of the broader aspects of the present invention.

The activating fibers of the illustrative heat-shrinkable web many be selected from a large group of fibers having such heat-shrinkable properties. Representative of such fibers are certain types of the following fibers: the vinyl polymer fibers, notably "Vinyon," a vinyl chloride-vinyl acetate copolymer composed of at least 85% and usually up to 90% by weight of vinyl chloride; "Rhovyl," a polyvinyl chloride polymer; saran, a polyvinylidene chloride-vinyl chloride copolymer composed usually of from about 4% to about 15% by weight of vinyl chloride; polyesters such as "Dacron" and "Kodel;" polyolefins such as low, medium and high density polyethyleness, isotactic polypropylenes; acrylics and modacrylics such as "Dynel," "Verel," "Acrilan," etc. Such fibers may also be included in the non-activating web, if desired.

Although a few representative activating or shrinkable fibres have been disclosed, it is to be appreciated that the inventive concept in its broader aspects is not to be construed as limited thereto. Substantially any synthetic thermoplastic fiber may be so manufactured or processed as to possess some shrinkage capabilities and consequently substantially any synthetic fibers may potentially be applicable to the principles herein disclosed. The greater the shrinkage, the greater is the potential application. As an indication of the degree of shrinkage involved, it can be stated that "Rhovyl" exhibits normal shrinkages up to about 60%; "Verel" up to about 50%; "Dacron" up to about 45%; and "Dynel" up to about 50%. Under controlled temperature conditions, these percentages may be varied upwardly or downwardly. Other fibers containing greater or lesser percentage shrinkages are, of course, useful where such greater or lesser effects are desired. In the main, however, percentage shrinkages of from about 20% to 75% has been found satisfactory with a range of from 35% to about 65% being preferred.

It is to be noted that the fibers must be in a relaxed condition during the shrinking process so that they are permitted to contract freely within the unbonded areas. If restraint is place on the shrinkable fibers, i.e., on the fabric as a whole, their degree of shrinkage is accordingly modified and controlled, as desired or required.

The non-activating fibers may be selected from a large group of fibers which are relatively non-shrinkable with respect to the shrinkable fibers, e.g., heat-shrinkable fibers.

Representative of such non-activating fibers are the natural fibers, notably cotton and linen, or the synthetic fibers, notably the cellulosics such as regenerated cellulose made by the viscose or cuprammonium process, cellulose esters such as the acetate and triacetate; polyamides such as nylon 6/6, nylon 6, nylon 11, etc.; fluorocarbons such as "Teflon;" mineral fibers such as glass; etc.

Inasmuch as the three-dimensional effect is obtained by means of the difference in heat-shrinking properties, it is possible to obtain such an effect by using two heat-shrinkable fibers, provided the difference in heat-shrinking properties is sufficient, or if the heat-shrinkable properties of one may be developed without developing the heat shrinkable properties of the other. The important factor to be considered, therefore, is the differential in shrinking which is developed under the conditions to which the webs are exposed during the heat treatment.

It is not essential that each fibrous web be composed of only one type of fiber. Blends and mixtures are, of course, possible in the nonshrinkable web as well as in the shrinkable web. However, it must be remembered that the blends or mixtures of fibers be such that the desired heat-shrinkable properties be developed. For example, in the case of the heat-shrinkable web, per se, it has been found that as little as about 15% by weight of activating fibers in that web itself may be present therein and still develop sufficient heat shrinkability.

The percentage of the activating fibers with respect to the total weight of all the webs in the nonwoven fabric is also a factor to be considered to insure the development of the desired surface effects. As little as about 5% by weight of the activating fibers on an over-all basis has been found satisfactory; although from about 16% to about 50% by weight is found preferable. Greater than 50% by weight may be used where special effects are desired.

It is preferred that the individualized textile fibers be of textile staple or equivalent length, or at least cardable, that is to say, from about ½ inch in average length up to about 3 inches or more in average length. Shorter fibers, down to about 3/16 inch average length may be added in various proportions to comprise about 50% by weight of the web, or even may comprise the entire web, particularly where the original method of web formation involved a fluid deposition of fibers, such as in a papermaking process, or in air deposition techniques. In such fluid deposition processes, average fiber lengths down to about 3/16 inch are preferred to the extremely short fiber lengths of down to about 1/16 inch and even below used in papermaking processes for making paper. Additionally, when the fluid deposition process is a papermaking process, the fibers should be in a relatively unbeaten form, in contrast to the beaten fibers used for promoting the hydration bonding of the very short fibers in paper.

It is essential that the length of the activating fibers, regardless of the web forming process used, must be sufficiently great as to bridge the gap between two adjacent binder areas. In this way, the shrinkable fibers are bonded in at least two points along their lengths, in order that they satisfactorily transmit buckling or puffing stresses to the unshrinkable fibers. The lengths of these shrinkable fibers must therefore be greater than the interbinder spaces and normally are at least 1½ and preferably at least 2 times the interbinder space. The particular interbinder space used will depend upon many factors such as the binder areas selected, the binder itself, the use of the bonded fabrics, etc. For specific values of such interbinder spaces, reference is made to the specific binder patterns noted in the U.S. patents referred to herein and in pending U.S. patent application Serial No. 711,580 filed January 28, 1958.

The interbinder space will also depend to a considerable extent upon the percent binder coverage of the nonwoven fabric, inasmuch as the greater the percent binder coverage, the less the interbinder space will tend to be. In a preceding paragraph, mention was made that the total surface coverage of the binder areas or line should not desirably exceed about 35% of the total surface of the nonwoven fabric. Such, however, is not intended to preclude the application of the present inventive concept to nonwoven fabrics wherein the binder coverage is substantially greater than about 35%. Normally, the greater the binder surface coverage, the less dramatic is the surface interest which is developed. Nevertheless, in some uses, such lesser surface interest is desired or required. The individual binder pattern areas or lines may therefore be increased in size or thickness, or there may be a greater number of binder pattern areas or lines per unit area, or a binder may be employed which migrates or spreads on the nonwoven fabric after being applied to thus cover a greater percentage of the surface area, say, up to 80 or 90% coverage. It is to be kept in mind, however, that there still remain interbinder spaces in which there is either no binder material at all or such small amounts of binder material that the free action of the fibers bridging the gap between the two adjacent binder areas is not hampered or impeded.

The denier of the synthetic fibers used in forming the webs is preferably in the range of the approximate thickness of the natural fibers mentioned and consequently deniers in the range of from about 1 to about 3 are preferred. However, where greater opacity or greater covering power is desired, deniers of down to about ¾ or even about ½ may be employed. Where desired, deniers of up to 10, 15, or higher, may be used. The minimum and maximum denier are, of course, dictated by the desires or requirements for producing a particular web or nonwoven fabric, and by the machines and methods for producing the same.

The weight of the individual fibrous web or layer of starting material may be varied within relatively wide limits, depending upon the requirements of the finished product. A single, thin web of fibers, such as produced by a card, may have a weight of from about 40 to about 200 grains per square yard. The minimum weight of nonwoven fabric contemplated by the present invention is, however, about 120 grains per square yard, obtained by plying three webs. The maximum weight may range upwards to about 3000 grains or more per square yard. Within the more commercial aspects of the present invention, however, web weights of from about 150 grains per square yard to about 2000 grains per square yard are contemplated. These weights are measured prior to shrinking of the fabric and will increase subsequent to shrinking.

The number of layers of webs in the starting materials must, of course, be at least two, in order to obtain the desired or required effects. Three, four, five or more layers, in any desired arrangement may be used where special effects are desired.

The binder used in adhering the plurality of webs together may be selected from a large group of such binders known to industry. It is necessary, however, that a binder be used which can satisfactorily adhere to and bond the different types of fibers together or at least mechanically interlock the fibers together. Representative of the binders available for such a purpose are: regenerated cellulose; vinyl resins such as plasticized or unplasticized polyvinyl acetate, polyvinyl chloride, polyvinyl alcohol, etc., either as homopolymers or copolymers; acrylic resins such as ethyl acrylate, methyl methacrylate, methyl acrylate, butyl methacrylate, etc.; butadiene resins such as butadiene-acrylonitrile, butadiene-styrene, etc.; other synthetic rubbers; natural rubber; urea resins such as urea-formaldehyde, cyclic urea-formaldehyde, etc.; aldehyde resins such as melamine-formaldehyde, phenol-formaldehyde, resorcinol-formaldehyde, etc.; epoxy resins; cellulose derivatives such as carboxymethyl cellulose; hydroxyethyl cellulose, etc.; starches; gums; casein; etc.

These binders may be added, as desired, in the form of emulsions, solutions, dispersions, plastisols, powders, etc. Autogenic bonding, preferably by heat and/or pressure and/or solvents, may also be used when thermoplastic fibers are present.

The percent add-on of such binder materials may be varied within relatively wide limits, depending to a large extent upon the specific binder employed and upon the type, weight and thickness of the nonwoven fabric. For some binders, as low as about 1% by weight up to about 12% by weight, based on the weight of the dry webs being bonded, has been found satisfactory. For other binders, as high as from about 15% to about 50% by weight has been found preferable. Within the more commercial aspects of the present invention, however, from about 2% to about 35% by weight based on the weight of the dry webs being bonded has been found desirable.

The particular size, shape and configuration of the binder pattern used falls within the scope and range of binder areas previously used in the prior art. Examples of some of these binder patterns may be found in the above-mentioned U.S. Patents 2,705,687 and 2,705,688 or in U.S. Patent 2,880,111. Specific examples of binder areas, binder shapes and sizes, and interbinder spaces are noted in said patents.

After the binder material has been applied to the fibrous web and set, either by regenerating, curing, heating, or drying, the bonded fibrous web is passed in a relatively relaxed condition to permit shrinkage over internally-heated speed-controlled drying cans or through a heated oven maintained at a temperature sufficiently high to activate and shrink the heat-shrinkable fibers. Overfeeding may be resorted to in order to provide the desired slack for shrinking or to control the extent of the shrinking.

The exposure temperature on the drying cans or in the oven is determined by the nature of the heat-shrinkable fibers. Fabric temperatures as low as about 150° F. have been found satisfactory for some fibers, whereas as high as about 400° F. has been found desirable for other fibers. Higher temperatures may be used where there is no damage to any of the fibers in the nonwoven fabric.

The time exposure is interdependent upon the temperature and a normal heating time of from about 12 seconds up to about 5 minutes, and preferably from about ½ minute to about 2 minutes, is found satisfactory. Other things being equal, it has been found that the exposure time may be decreased by using a higher temperature, and that a lower temperature may be used in some cases to avoid fiber damage by using increased exposure periods. Subsequent to the development of the heat-shrinkable properties, the three-dimensional nonwoven fabric is forwarded for further processing as desired or required.

The inventive concept will be described in greater specificity by reference to the accompanying drawings and following specifications wherein there is illustrated and described a preferred apparatus and method for producing the novel products of the present invention. It must be understood, however, that the inventive concept is not to be considered limited to the constructions shown except as determined by the scope of the appended claims. In the drawings:

FIGURE 1 is a schematic perspective view of a portion of a bonded nonwoven fabric composed of a plurality of unspun fibrous webs, prior to processing in accordance with the principles of the present invention;

FIGURE 2 is an enlarged idealized cross-section view of the plurality of fibrous webs of FIGURE 1, taken on the line 2—2 thereof in the direction indicated, prior to processing in accordance with the principles of the present invention;

Figure 7C:
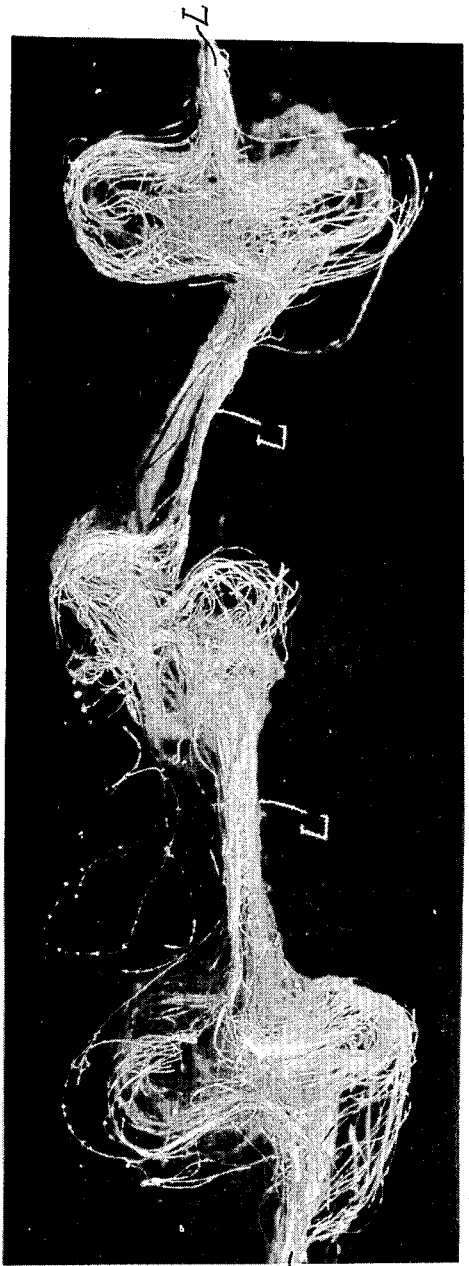
Figure 7D:
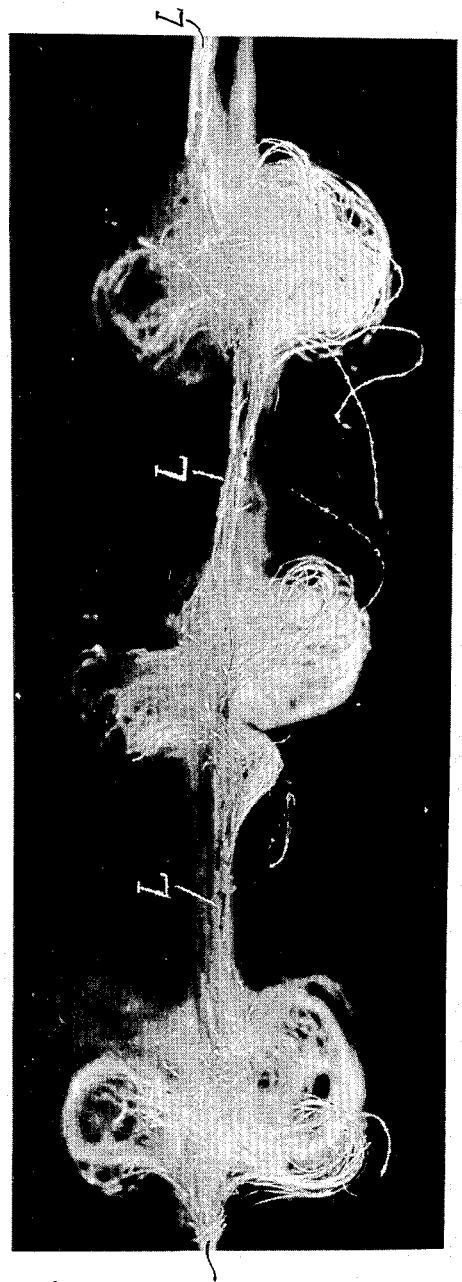
Figure 7E:
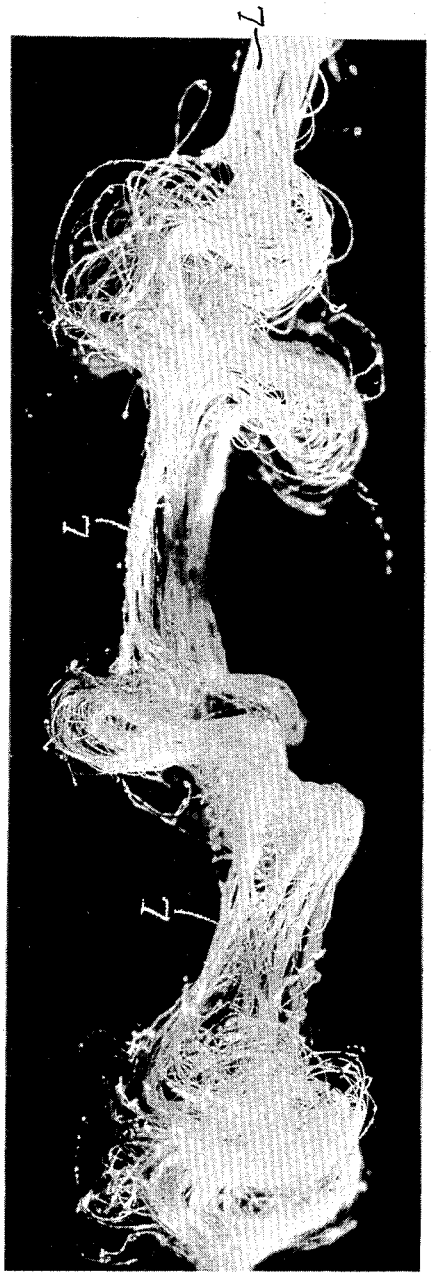

FIGURE 7, a through e, represent a series of photomicrographs of 20× magnification taken at spaced intervals along one section of one fabric of the invention. They refer to the varying positions of fibers throughout the length of a buckle as it is shown in cross-sectional series at given intervals.

FIGURE 8 is a schematic view of the apparatus and a method suitable for utilizing the principles of the present invention on a plurality of webs.

In FIGS. 1 and 2, there is illustrated a nonwoven fabric 10 comprising a fibrous layer 12 containing non-heat-shrinkable fibers and a fibrous layer 14 containing heat-shrinkable fibers. The two layers 12 and 14 are bonded together by binder areas 16 in a wavy-line intermittent print pattern extending across the width of the nonwoven fabric 10. The relative flatness and two-dimensional nature of the nonwoven fabric 10 is to be noted especially. Present within the laminated fabric of FIGURES 1 and 2 are a percentage of activating fibers having a differential in shrinking which is developed at a given temperature or within a given temperature range, while any shrinking properties of the remaining fibers are not developed at that temperature or temperature range; therefore, the fabric of this construction has the latent ability to buckle, in accordance with the teachings of this invention, when treatment, e.g., heat, sufficient to develop the shrink properties of the activating fibers is applied. In this instance layer 14 contains the activating fibers.

While the fabric depicted by FIGURES 1 and 2 would in reality be constructed of a plurality of webs of individualized textile fibers and at least one of those webs would contain activating fibers, the layers would not be discernible in the laminate. When webs of individualized textile fibers are placed one on top of another, no interface is readily visible unless there is a difference in color or denier or length of the fibers and even in those instances the interface is diffused. The resultant composite or laminate is a flimsy matt of fibers wherein there is a degree of intermingling of fibers of each web at the interface.

Figure 2A:
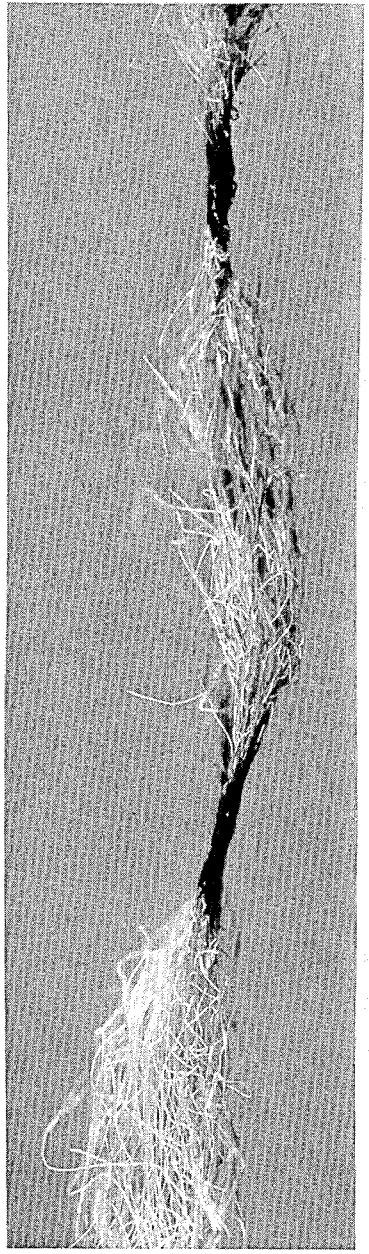
FIGURES 2c, 2a and 2b are photomicrographs of cross-sections of a three-ply unbonded laminate as well as two-ply and three-ply bonded laminates respectively, of the fabric of this invention prior to activating treatment. The magnification is 20×.
Figure 2B:
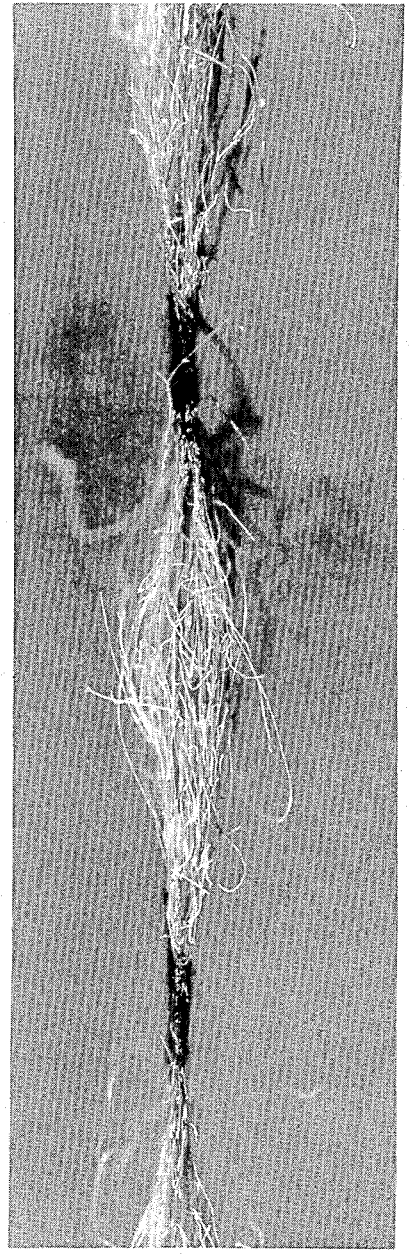

A photomicrograph of a cross-section of a laminate of three card webs of individualized textile fibers under 20× magnification containing a middle layer having activating fibers, sandwiched between two layers of non-activating fibers is shown in FIGURE 2b and no interface between the webs is apparent. The individualized fibers intermingle and intertwine to a degree along the interface as one web is placed upon the other and compressed to form a laminate. This unbonded laminate is very flimsy and is easily destroyed.

In processing this laminate to apply the binder in a predetermined pattern of spaced binder areas, the individual webs of the laminate are pressed together, e.g., by rollers, to compress the springy unbonded laminate and thereby insure that the binder contacts fibers throughout the thickness of the composite or laminate. The fibers of one web grade into the fibers of the other and a diffusion zone of a somewhat gradiated mixture of the fibers of the two facing webs define their area of contact.

FIGURE 2a is a photomicrograph of a cross-section of a two-ply laminate which has been print bonded and which contains a web of activating fibers and a web or layer of non-activating fibers. At a magnification of 20× no interface is in evidence. The print pattern was a wavy-line pattern spaced four to the inch and by simply compressing the laminate at the bond area and applying a colored binder, the characteristics of the cross-section have not been changed other than being compressed, i.e., there is still no sharp interface between webs and a diffusion zone of the fibers of both webs defines the contact of the two.

Figure 2C:
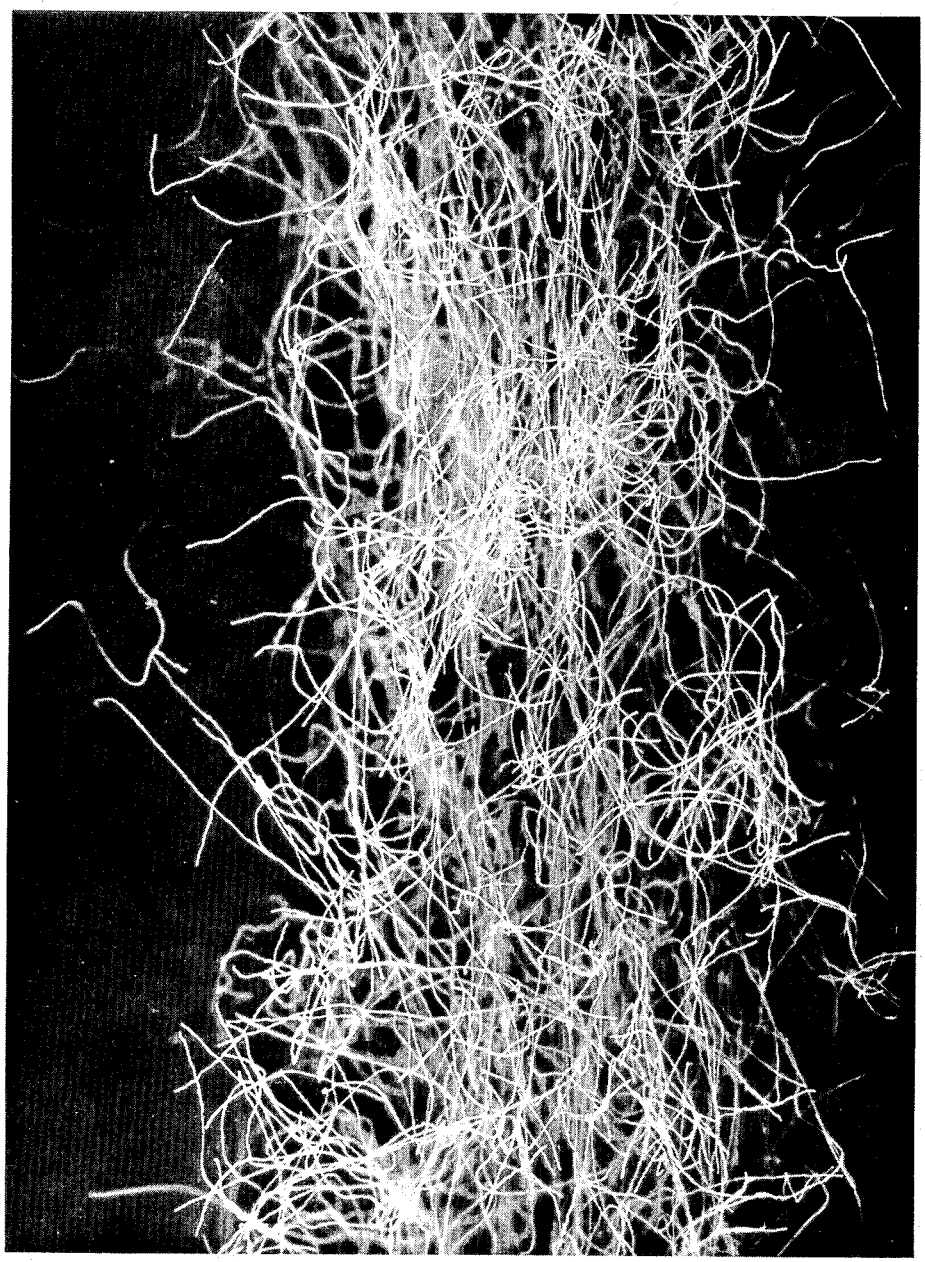

FIGURE 2b is a cross-section of the three-ply laminate of FIGURE 2c after it has been print bonded by a wavy-line pattern of four to the inch. As is the case in FIGURE 2a, the binder areas are darkened since the binder was colored; nevertheless, the nature of the cross-section of the laminate remains the same in the bond areas as it is shown to be in the unbonded areas, i.e., the lighter areas that are not compressed to such a degree as the binder areas. The only difference in the two areas is that in the application of the binder, the laminate was compressed along the binder areas to insure that the binder contacted all fibers within that area and that the fibers were closely associated in the median plane of the fabric to insure the fiber association necessary to establish an effective bond.

Figure 3:
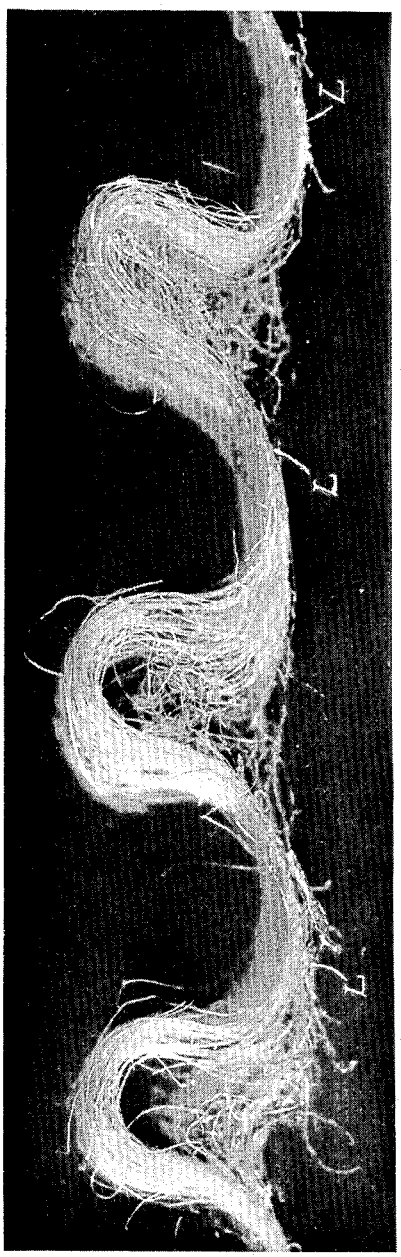
FIGURES 3–6 are photomicrographs of cross-sections of fabrics of various embodiments of the invention. The magnification is 20×.

FIGURE 3 is a photomicrograph, at a magnification of 20×, of a cross-section of a fabric of this invention. A series of buckles is seen extending in one direction from the plane of the fabric. The base of the concomitant troughs defines the effective area of the binder and, as can be seen, the individual fibers in this binder area are intermingled, closely associated, and lay substantially in the plane of the fabric, i.e., the plane of each fabric which connects the extending points designated by the letter L in FIGURES 3–7e, which defines the approximate lowest point, i.e., the outer periphery, of each trough shown in cross-section. In this embodiment, each of the buckled areas can be seen to rise substantially from the plane of the fabric and the majority of the fibers within each buckle are seen as following the contour of the buckle in a diffused relationship to one another. Additionally, the fiber density can be seen to vary within each buckle between the bottom of the plane of the fabric and the vertex of the buckle, to establish greater bulk or body as to each buckle. Thus the fibers in the unbonded area are said to be diffused between the plane of the fabric and the vertices of the buckle.

Figure 4:
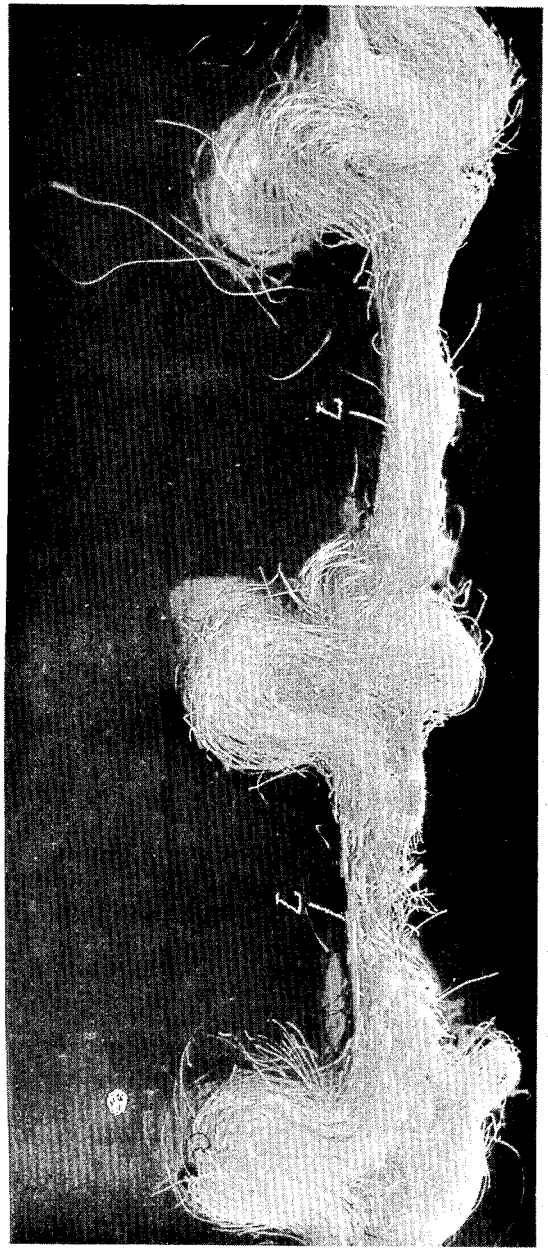

FIGURE 4 is a photomicrograph of 20× magnification of a cross-section of the fabric of Example VII. The buckles are bicorporal, i.e., have two bodies separated by the plane of the fabric, and they are asymmetric, i.e., each of the two bodies with respect to its complimentary member. The fiber density within the buckle is seen to vary between the plane of the fabric and the vertices of the buckle. Thus the interior of the buckle is seen to be populated by diffused individual fibers between the plane of the fabric and each of the vertices of the bicorporal buckle. This fabric was initially composed of six individual webs of nonwoven fibers. The middle two layers, i.e., internal layers 3 and 4 of the fabric, were the webs of shrinkable fibers in this instance.

Figure 5:
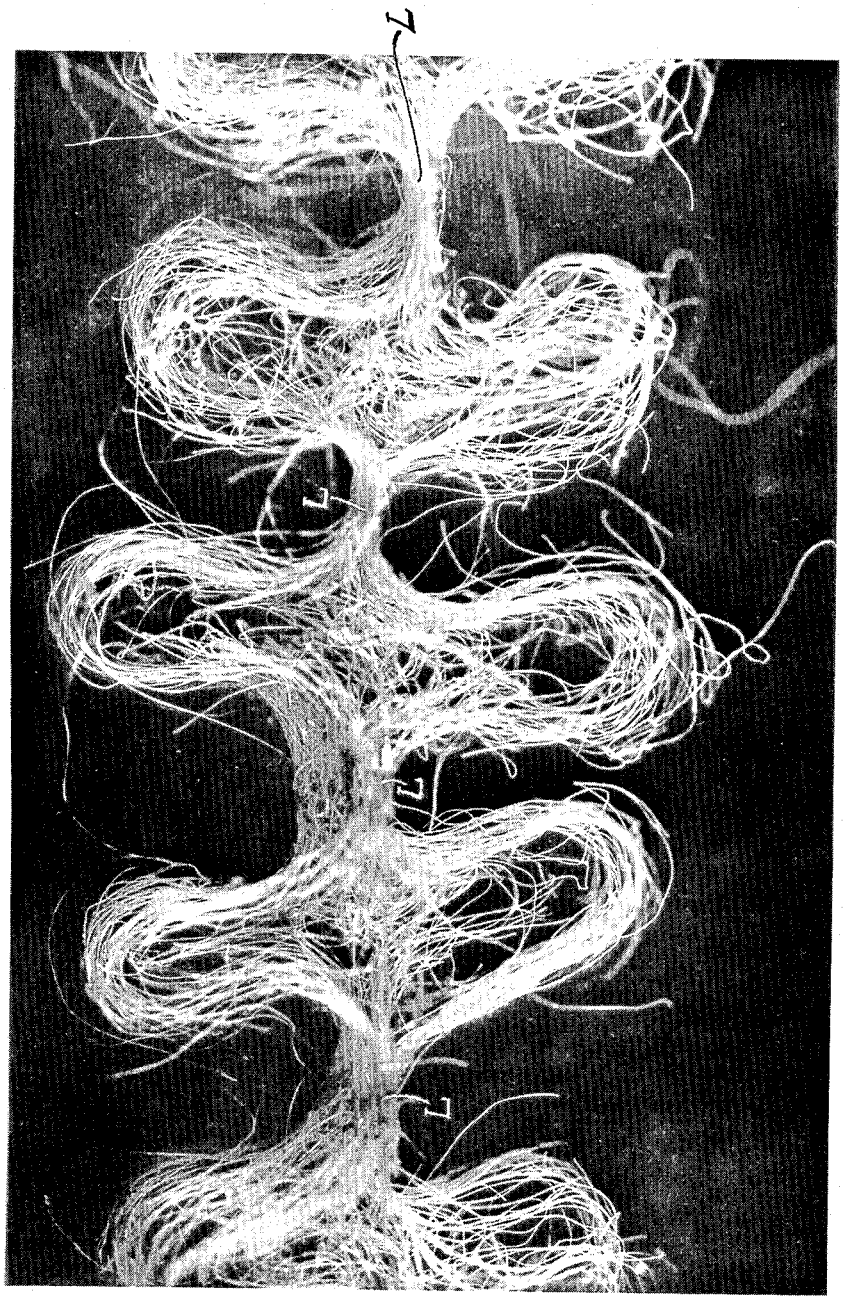
Figure 6:
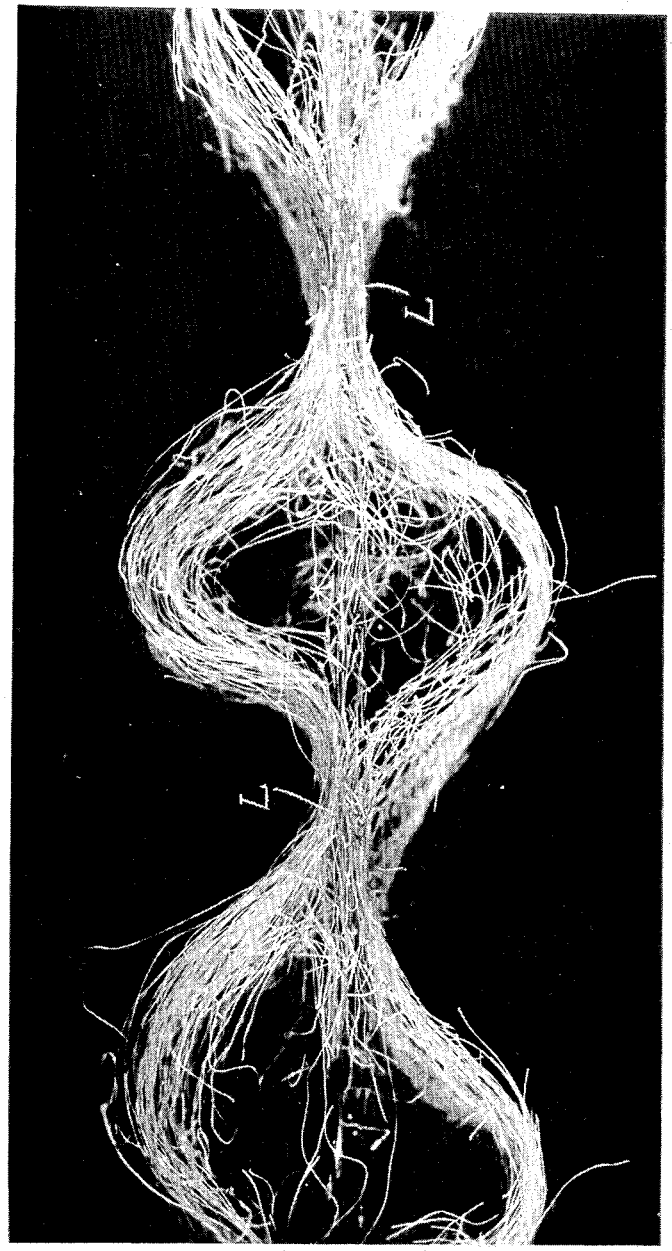

FIGURES 5 and 6 are photomicrographs of cross-sections taken of separate fabrics wherein 52.8% and 20% shrinkage, respectively, has taken place. The buckles and associated troughs of the laminate, or of the composite, are distinctly visible and, while it must be appreciated that the clarity is specific only as to the plane of focus, varying fiber density from the plane of the fabric to the vertices of each bicorporal buckle is clearly in evidence. The bicorporal buckles are ideally visualized as being symmetrical; however, while a degree of symmetry is approached they can be seen as being largely asymmetric.

By carefully controlled conditions more symmetry may be attained. This is, of course, related to the print pattern which may be applied to both faces of the initial laminate. If the print patterns of both coincide exactly, true symmetry of the bicorporal of buckles will be approached. Additionally, the back to back lamination of two fabrics similar in appearance to that of FIGURE 3 could result in a fabric with a high degree of symmetry.

FIGURES 7a through 7e are photomicrographs of 20× magnification, each taken at approximately ¼″ intervals in the direction of the buckle across the fabric of Example VIII; therefore, the position of each of the ripples remains constant throughout the series with respect to the others. The perimeter of an individual bicorporal ripple is seen to change through the series from (a) to (e) and the internal fiber density between the plane of the fabric and the vertices of the bicorporal ripple is seen to vary along the length of the buckle. In all cases, each individual buckle is shown as being composed of fibers diffused from the original close relationship that they had prior to shrinking, as is shown in FIGURES 1 and 2. In all instances the area of the base of the trough which represents the binder area area is seen to contain intermingled and closely associated fibers following, substantially, the plane of the fabric.

From the above photomicrographs it can be seen that controlled shrinkage causes the more shrinkable of the fibers, not in the print or bonded area, to contract, causing both the shrinking and non-shrinking fibers to buckle and intermingle somewhat depending upon the weight of the fabric as a whole, the number and individual weight of the initial starting layers; as well as, the degree and type of print bonding employed, and the percent shrink and the length of the fibers involved. For example, if the initial fabric were to be print bonded on both sides using two different print patterns, one on each side, an out of phase series of bicorporal buckles would certainly result. This could be employed to a point where the individual buckles projecting from opposed sides of the fabric could not be termed bicorporal since the base of one might more nearly approach a contiguous relationship to the base of a trough separating two ripples which project from the other face of the fabric.

Under activating treatment, i.e., shrinking treatment, the activating fibers within the unbonded areas, that are bonded along their length at points in adjacent bond areas and therefore span an unbonded area, contract. Those activating fibers that do not span that individual unbonded area even though these fibers are also bonded twice along their length and are of a length sufficient to span the bond zone, contract and buckle or extend away from the plane of the fabric. The contraction of the activating fibers that span an individual unbonded area and are therefore bonded along their length in each of these bond areas, forces the non-activating fibers to buckle and extend away from the plane of the fabric. Thus, dispersed between the plane of the fabric and the vertices of the buckles are a mixture of activating and non-activating fibers, while running along the plane of the fabric are those activating fibers that are firmly seated in the adjacent bond areas and span the unbonded areas. These latter activating fibers are directly responsible for the buckling which effects a diffusion of fibers in the unbonded area. The fibers within the buckle are diffused with respect to the position they occupied in the laminate prior to shrinkage of the fabric, and while the majority of both the activating and non-activating fibers, in the non-bonded areas, follow the contour of the buckle, many become intermingled to extend throughout the interior of the buckle to provide varying fibers density between the plane of the fabric and the vertex or vertices of the buckle. Here, varying fiber density has two meanings. It refers to the varying positions of fibers throughout the length of a buckle as is shown in the cross sectional series of FIGURES 7a through 7e . Throughout the length of a buckle, the individual fibers which are all diffused with respect to each other, assume no pattern which is duplicated in an adjacent plane taken through the same buckle. Thus the fiber density of the interior of the buckle varies throughout its length. Then within any one plane taken through a buckle, the diffusion of the fibers is not progressive nor systemitized, but rather random. In most cases, however, the greatest fiber density is found near, and associated with, the perimeter of the buckle, although the fiber density of the interior of the buckle may vary from a sparse state to a dense state, e.g., FIGURES 6 and 4 respectively. In any event, the fiber diffusion provides a bulky buckle having other than a void for an interior.

Within the bonded areas there is very little, if any, contraction by the activating fibers during activating or shrinkage treatment since all fibers within each of these particular areas are held by the binder and they thus remain in their closely associated relationship, i.e., in the relationship shown in FIGURES 2b and 2c. Thus in the bond areas there are no interfaces defining the individual webs or layers and the individualized fibers of one layer grade into those fibers of the other layer to provide a diffused zone between webs wherein the fibers of both webs are intermingled and entangled and wherein the entire bond zone is represented by fibers that have been compressed to close fiber association by the application of the webs one to another and by application of the binder.

The buckles, ripples, or pillows become permanent in nature since the activating fibers are bonded at least twice along their length, and because those that span an individual unbonded area are firmly seated in adjacent bonded areas. Thus when these particular activating fibers are made to contract, they cannot pull from the bond zones and the buckle cannot be destroyed without breaking at least one of the two bond sites on each of these activating fibers that span the unbonded areas.

The fibers within the buckles are diffused and within any particular cross-section, which merely represents a plane bisecting the fabric, the fibers are diffused between the plane of the fabric and the vertex of the buckle. The extent or degree of diffusion varies with the type of bond, the extent of shrinkage, etc. as was discussed earlier. However, the buckles or ripples extend, in length, beyond this one cross-sectional plane, a distance which is regulated by the print pattern and the type of print.

In FIGURE 8, there is illustrated apparatus and method suitable for carrying out the principles of the present inventive concept. The nonwoven fabric 40 is composed of a web 42 of non-heat-shrinkable fibers, upon which is positioned a second web 44 of a heat-shrinkable fibers and a third web 46 of non-heat-shrinkable fibers. The three webs 42, 44, 46 are bonded together with a spaced intermittant bonding line pattern by being passed through the nip of a backing roll 48 and an applicator line-printing roll 50 which is contact with an immersion roll 52 in a binder bath 54. The rolls 48, 50 and 52 are so adjusted that the binder agent is picked up from the binder bath 54 by the immersion roll 52, transferred to the applicator roll 50 and pressed into the nonwoven fabric 40 in intermittent lines by means of the backing roll 48.

The binder is then set by being regenerated, cured, heated or dried, as desired or required for the particular binder involved, in a setting unit 60, and the bonded nonwoven fabric is then heat-treated in an oven 70 whereby the heat-shrinkability properties are activated to contract and increase the density (weight per unit area) of the heat-shrinkable layer and whereby the three-dimensional effect is developed. If desired, the heating oven may be replaced by a plurality of internally-heated, separately speed-controlled drums and the nonwoven fabric passed in direct contact therewith. The finished fabric may then be forwarded for product wind-up or other processing, as desired.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

A card web weighing 180 grains per square yard and comprising 50% by weight of 1½ denier, 2-inch staple length viscose rayon and 50% by weight of cotton is plied with a second card web weighing 180 grains per square yard and comprising 50% by weight of 1½ denier, 2-inch staple length viscose rayon and 50% by weight of 1.8 denier, 2-inch staple length "Rhovyl 55" fibers (heat-shrinkable polyvinyl chloride fibers made by Societe Rhovyl). The plied webs are print bonded with a wavy-line print pattern extending across the width thereof basically at 90° to the long axis of the webs. There are four wavy binder lines per inch of fabric, with each wavy binder line measuring about 0.06 inch. The binder used is a combination thermosetting-thermoplastic resin comprising melamine-formaldehyde and "Rhoplex B–15" (an ethyl acrylate resin binder made by Rohm & Haas). The percent binder add-on is about 20% by weight, based on the weight of the nonwoven fabric. The surface coverage is about 24%. The binder is dried at about 200° F. The dried web is then heat shrunk by exposure to heat at 270° F. under relaxed, relatively tensionless conditions to yield a rippled nonwoven fabric having approximately six ripples per inch. The weight of the bonded nonwoven fabric prior to the heat treatment is about 430 grains per square yard. Subsequent to heating, the fabric weighs about 650 grains per square yard. Such a fabric is suitable for use as a disposable face towel. It is soft, bulky and lofty and possesses increased absorbency due to the increased rippled surface area. It has an excellent appearance and an unusual rippled surface interest.

*Example II*

A three-layered fibrous structure is prepared as follows: the outer two layers each weigh 120 grains per square yard and comprise 50% by weight of 3 denier, 2-inch staple length viscose rayon and 50% by weight of cotton and the center layer weighs 120 grains per square yard and comprises 50% by weight of 3 denier, 2-inch stable length viscose rayon and 50% by weight of 3 denier "Dynel" acrylic fibers. The three layers are print bonded with a wavy-line binder pattern extending across the width of the fabric basically at 90° to the long axis thereof. There are 4 wavy binder lines per inch, with each wavy binder line measuring about 0.015 inch wide. The binder used is a thermosetting-thermoplastic resin comprising melamine-formaldehyde and "Rhoplex B–15" (an ethyl acrylate resin binder made by Rohm & Haas). The percent binder add-on is about 20% by weight. The surface coverage is about 20%. The printed nonwoven fabric is dried at approximately 200° F. and is then heat shrunk at a temperature of about 250° F.

The center layer shrinks considerably causing the two outer layers to buckle and form a series of wavy ripples extending across the width of the fabric. Such a material is suitable for use as a dusting cloth. It is soft, bulky and lofty and possesses excellent absorbency due to the increased surface area created by the wavy ripples. Its appearance is excellent and its rippled surface interest is unusual.

*Example III*

A card web weighing 180 grains per square yard and comprising 100% by weight of cotton is plied with two outer card webs each weighing 180 grains per square yard and comprising 100% by weight 1½ denier, 2-inch staple length "Dacron" polyester fibers. The binder is polyvinyl chloride plastisol. The print pattern comprises 6 binder lines extending across the plied web, each binder line measuring about 0.024 inch wide. The bonded nonwoven fabric is shrunk by treatment with 18% by weight sodium hydroxide solution at 4° C. A shrinkage of 45% in the machine direction is obtained, along with puckered ridges in the unbonded areas extending across the width of the nonwoven fabric. The resulting fabric has an excellent appearance and hand and has an unusual rippled surface interest.

*Example IV*

A three-layered fibrous structure is prepared as follows: the outer two webs each weigh 180 grains per square yard and comprise 100% by weight of 1½ denier, 2-inch staple length viscose rayon fibers and the center web weighs 180 grains per square yard and comprises 50% by weight of 1½ denier, 2-inch staple length viscose rayon and 50% by weight of 1.8 denier, 2½ inch staple length "Rhovyl 55" fibers (heat-shrinkable polyvinyl chloride fibers made by Societe Rhovyl). The three webs are plied together and are printed with a spaced, intermittent wavy-line print pattern having 4 lines per inch, as measured in the machine directon. These lines, as engraved on the printing roll, are 0.024 inch wide. The area of initial coverage of the binder is therefore 9.6%.

The binder applied is plasticized polyvinyl chloride latex to which is added 1% ammonium caseinate stabilizer and 1% "Triton X–100" (alkyl aryl polyether alcohol) nonionic wetting agent. The binder migrates considerably and it is determined that the final binder surface coverage, after being dried at approximately 200° F. is approximately 50%.

The printed nonwoven fabric is then heat-shrunk at a temperature of about 265° F. and the center layer shrinks considerably, causing the two outer layers to buckle and form a series of wavy ripples extending across the width of the fabric, thus creating excellent surface interest.

*Example V*

A three-layered fibrous structure is prepared as follows: the two outer webs each weigh 160 grains per square yard and comprise 100% by weight of 1½ denier, 2-inch staple length viscose rayon fibers and the center layer weighs 160 grains per square yard and comprises 100% by weight of 3 denier, 2-inch staple length "Dynel" Type 63 acrylic fibers. The three layers are print bonded with a pattern comprising 16 straight lines per inch at an angle of 20° to the cross direction. These lines, as engraved on the print roll, are 0.016 inch wide. The initial surface coverage is therefore 25.6%. The binder is plasticized polyvinyl chloride latex to which is added 1% ammonium caseinate stabilizer and 1% "Triton X–100" nonionic wetting agent. The printed fabric is dried at approximately 200° F. and the surface coverage, including migration of the binder, is about 88%.

The printed nonwoven fabric is then heat-shrunk at a temperature of about 260° F. and the center layer shrinks considerably causing the two outer layers to buckle and form a wavy-rippled nonwoven fabric with good surface interest.

*Example VI*

A three-layered fibrous structure is prepared as follows: the outer two layers each weight 150 grains per square yard and comprise 100% by weight of 1½ denier, 2-inch staple length viscose rayon fibers and the center layer weighs 150 grains per square yard and comprises 100% by weight of 4.5 denier, 2-inch staple length "Propylon" polypropylene fibers. A spaced, intermittent diamond print pattern is employed in which the engraving on the print roll covers approximately 19.6% of the total area. The binder is "Rhoplex B–15," an acrylic latex made by Rohm & Haas. The printed nonwoven fabric is dried at approximately 200° F. and the surface coverage, with migration of the binder, is determined to be about 75%. The nonwoven fabric is then heat-shrunk at a temperature of about 250° F. and the center layer shrinks considerably causing the two outer layers to buckle, creating a quilted effect with the fibers pillowing around the diamonds providing good surface interest.

*Example VII*

A six-layered fibrous structure is prepared as follows: each of the interior layers, i.e., layers 3 and 4 are carded and consist of 60% by weight 3.0 denier, 1½ inch staple "Rhovyl 55" and 40% by weight SN 5,813 surgical rayon. The four outer layers, i.e., layers 1, 2, 5 and 6, are also carded and are composed of 100% SN 5,813 surgical rayon. Following the procedure taught in U.S. 2,862,251, the laminate of six webs of loosely assembled fibers is fed into fiber rearranging apparatus, and 95 holes per square inch (staggered) are provided therein. The plied laminate is then print bonded on both sides with a wavy-line print pattern extending across the width thereof basically at 90° to the long axis of the webs. There are 4 wavy binder lines per inch of fabric, with each wavy binder line measuring about 0.015 inch wide. The binder used is viscose.

This fabric is used as a disposable surgical sponge. Rippling is achieved during the steam sterilization process on site, where the fabric is usually quarter-folded in an unrestricted state and exposed to a temperature of about 250° F. for approximately twenty minutes. These sponges are usually wet in saline solution and then rung out prior to use where they function to pack body cavities and to protect vital organs in operational procedures. Prior to buckling or rippling by heat treatment, the fabric measured 18 x 18 inches and weighed 1150 grains per square yard. After buckling (heat treatment) the fabric measured 18 x 15¼ inches and weighed 1425 grains per square yard.

*Example VIII*

Following the procedure of Example VII, a laminate of six webs of nonwoven fiber was prepared. Each of the two inner layers, i.e., webs 3 and 4, contain 50% of "Rhovyl 55" and 50% rayon, while the outer layers or webs, i.e. 1, 2, 5 and 6, contain 100% rayon. Following the procedure of U.S. 2,862,251, the laminate of six webs of loosely assembled fibers was fed into fiber rearranging apparatus and 165 holes per square inch (staggered) are provided therein. The laminate is then print bonded with a wavy-line print pattern extending across the width thereof basically at 90° to the long axis of the webs. There are 4 wavy-line binder lines per inch of fabric, with each wavy-line binder line measuring about 0.015 inch wide. The binder used is viscose. In order to retain the whiteness of the fabric after sterilization, the fabric is bleached with warm sodium hypochlorite solution and color-stabilized with finish solution containing sodium bisulfate/trisodium phosphate, as was also accomplished with the fabric in Example VII. Sterilization of the fabric obtained resulted in a unique change in fabric appearance. The sample shrank almost 50% in the machine direction, forming numerous buckles. Prior to sterilization the sponges are quarter-folded in use and placed unrestricted in a steam sterilizer. The fabric or sponge, sterilized in this manner, was unfolded and three 2 inch wide strips cut in the machine direction. One 4 inch long and two 3 inch long strips were then pulled out to their maximum length and the length noted. The percent shrinkage was then calculated with the stretch length as the base as follows:

$$\text{Percent stretch} = \frac{\text{Stretched length} - \text{rippled length}}{\text{Stretched length}} \times 100$$

The data is summarized below:

| Sample | 1 | 2 | 3 | Average |
|---|---|---|---|---|
| Stretched Length, inches | 6½ | 5 | 4⅞ | |
| Rippled Length, inches | 4 | 3 | 3 | |
| Stretched, inches | 2.5 | 2 | 1⅞ | |
| Stretched, percent | 38.5 | 50 | 38.5 | 39 |

In some instances, it is desired that the rippled effect be accentuated and that the ripples themselves have some body or hand. This may be accomplished by positioning two fibrous webs or nonshrinkable fibers on one or both sides of a shrinkable web and then exposing the same to fiber-shrinking action. Each ripple or wave will thus have double thickness and provide a firmer body thereto.

In another variation, an outer nonshrinkable fibrous web and an inner layer of creped tissue are bonded to a base shrinkable web, with the layer of creped tissue next to the shrinkable web. Subsequent exposure to shrinking action provides a double-thickness ripple with a creped tissue inside the rippled fibrous web to provide a crisp fullness thereto.

Although several specific examples of the inventive concept have been described, the same should not be construed as limited thereby nor to the specific substances or constructions mentioned therein but to include various other equivalent substances and constructions as set forth in the claims appended hereto. Weights, dimensions and other physical properties referred to herein refer to the fibrous webs or nonwoven fabrics, prior to the heat-shrinking process, unless specifically stated otherwise. It is understood that any suitable changes, modifications and variations may be made without departing from the spirit and scope of the invention.

This patent application is a continuation-in-part of our co-pending, commonly assigned patent application Serial Number 55,007 filed September 9, 1960, entitled, "Nonwoven Fabrics and Methods of Making the Same."

We claim:

1. A method of making a nonwoven fabric having three-dimensional surface interest and a full-bodied hand which comprises bonding together at least one layer of overlapping, intersecting, shrinkable individualized textile fibers and at least one layer of overlapping, intersecting, relatively non-shrinkable individualized textile fibers, in a predetermined pattern of spaced binder areas, the fibers of said shrinkable layer having a fiber length greater than the space between adjacent binder areas whereby the unspun fibers are bonded in at least two points along their length, and treating said bonded layers to cause the shrinkable fibers to shrink, whereby a series of buckled sections and concomitant trough sections are produced, said trough sections representing the binder areas wherein said fibers are closely associated in substantially the plane of the fabric, and said buckled sections representing the unbonded areas of the fabric wherein the individual fibers are substantially diffused with respect to one another between the plane of the fabric and the vertex of said buckled section.

2. A method of making a nonwoven fabric having three-dimensional surface interest and a full-bodied hand which comprises bonding together a plurality of layered webs of individualized textile fibers in a predetermined pattern of spaced binder areas, at least one of said webs comprising nonactivating fibers, and at least one other of said webs comprising activating fibers having a fiber length greater than the space between adjacent binder areas whereby the activating fibers are bonded in at least two points along their length, and treating said bonded layers to cause the activating fibers to shrink whereby a series of bicorporal buckled sections and concomitant trough sections which impart a three-dimensional effect to the fabric are produced, said trough sections representing the binder areas wherein said fibers are closely associated in substantially the plane of the fabric and said bicorporal buckled sections being divided by the plane of the fabric to extend in opposed directions from the fabric, said buckled sections representing the unbonded areas of the fabric wherein the individual fibers are substantially diffused with respect to one another, between the plane of the fabric and the vertices of said buckled sections.

3. A laminated fabric of improved loft, a full-bodied hand and three-dimensional surface interest comprising at least two substantially indistinctly layered webs of individualized textile fibers intermittently bonded together in a predetermined pattern of spaced binder areas, at least one of said layers comprising a fibrous web of nonactivating fibers and at least one other of said webs comprising a fibrous web of overlapping, intersecting activating fibers having a fiber length greater than the space between adjacent binder areas whereby the activating fibers are bonded in at least two points along their length, said fabric being characterized by a series of buckled sections and concomitant trough sections, said trough sections representing the binder areas wherein said fibers are closely associated in substantially the plane of the fabric, and said buckled sections representing the unbonded areas of the fabric wherein the individual fibers are substantially diffused with respect to one another, between the plane of the fabric and the vertex of said buckled section.

4. A laminated fabric of improved loft, a full-bodied hand and three-dimensional surface interest comprising at least two substantially indistinctly layered webs of individualized textile fibers intermittently bonded together in a predetermined pattern of spaced binder areas, at least one of said layers comprising a fibrous web of nonactivating fibers and at least one other of said webs comprising a fibrous web of overlapping, intersecting activating fibers having a fiber length greater than the space between adjacent binder areas whereby the activating fibers are bonded in at least two points along their length, said fabric being characterized by a series of bicorporal buckled areas and concomitant trough sections, said trough sections representing the binder areas wherein said fibers are closely associated in substantially the plane of the fabric, and said bicorporal buckled sections being divided by the fabric plane to extend in opposed directions from the fabric, said buckled sections representing the unbonded areas of the fabric wherein the individual fibers are substantially diffused with respect to one another, between the plane of the fabric and the vertices of said buckled sections.

5. A laminated fabric comprising a plurality of layered nonwoven webs of individualized textile fibers intermittently bonded together in a predetermined pattern of spaced binder areas, at least one of said layers comprising a web of nonactivating fibers and at least one other of said webs comprising a web of activating fibers having a fiber length greater than the space between adjacent binder areas, whereby the activating fibers are bonded in at least two points along their length, said fabric having the latent ability, upon being treated to shrink said activating fibers, to develop a three-dimensional effect characterized by a series of buckled sections and concomitant trough sections, said trough sections representing the binder areas wherein said fibers are closely associated in substantially the plane of the fabric, and said buckled sections representing the unbonded areas of fabric wherein the individual fibers are substantially diffused with respect to one another, said fiber diffusion effecting varying fiber density between the plane of the fabric and the vertex of said buckled section.

6. A laminated fabric comprising a plurality of layered nonwoven webs of individualized textile fibers intermittently bonded together in a predetermined pattern of spaced binder areas, at least one of said layers comprising a web of nonactivating fibers and at least one other of said webs comprising a web of activating fibers having a fiber length greater than the space between adjacent binder areas, whereby the unspun fibers are bonded in at least two points along their length, said fabric having the latent ability, upon being treated to shrink said activating fibers, to develop a three-dimensional effect characterized by a series of bicorporal buckled sections and concomitant trough sections, said trough sections representing the binder areas wherein said fibers are closely associated in substantially the plane of the fabric, and said bicorporal buckled sections being divided by the plane of the fabric to extend in substantially opposed directions from said plane, said buckled sections representing the unbonded areas of the fabric wherein the individual fibers are substantially diffused with respect to one another, between the plane of the fabric and the vertices of said buckled sections.

7. A laminated fabric comprising a plurality of layered nonwoven webs of individualized textile fibers intermittently bonded together in a predetermined pattern of spaced binder areas, at least one of said layers comprising a web of nonactivating fibers and at least one other of said webs comprising a web of activating fibers having a fiber length greater than the space between adjacent binder areas, whereby the unspun fibers are bonded in at least two points along their length, said fabric having the latent ability, upon being treated to shrink said activating fibers, to develop a three-dimensional effect characterized by a series of bicorporal buckled sections and concomitant trough sections, said trough sections representing the binder areas wherein said fibers are closely associated in substantially the plane of the fabric, and said bicorporal buckled sections being divided by the plane of the fabric to extend in substantially opposed directions from said plane, said buckled sections representing the unbonded areas of the fabric wherein the individual fibers are substantially diffused with respect to one another, said fiber diffusion effecting varying fiber density between the plane of the fabric and the vertices of said buckled sections.

8. A fabric of nonwoven webs of individualized textile fibers intermittently bonded together in a predetermined pattern of spaced binder areas, at least one of said webs being constructed of nonactivating fibers and at least one other of said webs being constructed of activating fibers having a fiber length greater than the space between adjacent binder areas, said fabric being characterized by a series of buckled sections and concomitant trough sections which impart a three-dimensional effect to the fabric, said trough sections representing the binder areas wherein said fibers are closely associated in substantially the plane of the fabric, and said buckled sections representing the unbonded areas of the fabric wherein the individual fibers are substantially diffused with respect to one another to provide varying fiber density between the plane of the fabric and the vertex of said buckled section, said fabric having improved bulk and full-bodied hand.

9. A full-bodied fabric of nonwoven webs of individualized textile fibers intermittently bonded together in a predetermined pattern of spaced binder areas, at least one of said webs being constructed of nonactivating fibers and at least one other of said webs being constructed of activating fibers having a fiber length greater than the space between adjacent binder areas, said fabric being characterized by a series of bicorporal buckled sections and concomitant trough sections which impart a three-dimensional effect to the fabric, said trough sections representing the binder areas wherein said fibers are closely associated in substantially the plane of the fabric, and said bicorporal buckled sections being divided by the fabric plane to extend in substantially opposed directions from said plane, said buckled sections representing the unbonded areas of the fabric wherein the individual fibers are substantially diffused with respect to one another, between the plane of the fabric and the vertices of said buckled sections.

References Cited by the Examiner

UNITED STATES PATENTS 2,880,111  3/59  Drelich et al. _____ 161—148 XR

ALEXANDER WYMAN, *Primary Examiner.*

EARL M. BERGERT, *Examiner.*

UNITED STATES PATENT OFFICE
CERTIFICATE OF CORRECTION

Patent No. 3,214,323                                                           October 26, 1965

Gordon D. Russell et al.

It is hereby certified that error appears in the above numbered patent requiring correction and that the said Letters Patent should read as corrected below.

Column 1, line 14, for "fabrics" read -- fibers --; line 45, for "2,673,363" read -- 2,676,363 --; column 4, line 26, for "fibers" read -- fiber --; column 7, line 29, for "specifications" read -- specification --; column 8, line 24, strike out "the"; column 9, line 61, strike out "area", second occurrence; column 10, line 33, for "fibers" read -- fiber --; column 11, line 13, strike out "a", second occurrence; line 18, before "contact" insert -- in --.

Signed and sealed this 16th day of August 1966.

(SEAL)
Attest:

ERNEST W. SWIDER                                    EDWARD J. BRENNER
Attesting Officer                                         Commissioner of Patents